US006674058B1

(12) United States Patent
Miller

(10) Patent No.: US 6,674,058 B1
(45) Date of Patent: Jan. 6, 2004

(54) APPARATUS AND METHOD FOR FOCUSING A LASER SCANNING CYTOMETER

(75) Inventor: Bruce E. Miller, Newton, MA (US)

(73) Assignee: Compucyte Corporation, Cambridge, MA (US)

( * ) Notice: Subject to any disclaimer, the term of this patent is extended or adjusted under 35 U.S.C. 154(b) by 0 days.

(21) Appl. No.: 09/666,060

(22) Filed: Sep. 20, 2000

(51) Int. Cl.[7] .................................................. G02B 27/40
(52) U.S. Cl. ................................. 250/201.4; 356/318
(58) Field of Search ......................... 250/201.2, 201.4, 250/234, 235, 236; 356/300, 311, 318, 445

(56) References Cited

U.S. PATENT DOCUMENTS

| | | | |
|---|---|---|---|
| 4,260,649 A | 4/1981 | Dension et al. ............ 427/53.1 |
| 4,340,617 A | 7/1982 | Deutsch et al. ............ 427/53.1 |
| 4,359,485 A | 11/1982 | Donnelly et al. .......... 427/53.1 |
| 4,622,095 A | 11/1986 | Grobman et al. ........... 156/630 |
| 4,690,561 A | 9/1987 | Ito .............................. 356/339 |
| 4,715,708 A | 12/1987 | Ito ................................ 356/72 |
| 4,751,779 A | 6/1988 | Nagatomo et al. ............. 29/603 |
| 4,752,668 A | 6/1988 | Rosenfield et al. ... 219/121 LH |
| 4,902,101 A * | 2/1990 | Fujihara et al. ............. 350/320 |
| 4,910,548 A * | 3/1990 | Taniguchi et al. .......... 354/407 |
| 4,915,501 A | 4/1990 | Steen .......................... 436/501 |
| 4,948,460 A | 8/1990 | Sandaiji et al. ............. 156/630 |
| 5,159,403 A | 10/1992 | Kosaka ....................... 356/243 |
| 5,185,265 A | 2/1993 | Steen et al. ................... 436/63 |
| 5,310,624 A | 5/1994 | Ehrlich ....................... 430/322 |
| 5,389,196 A | 2/1995 | Bloomstein et al. ........ 156/643 |
| 5,469,251 A | 11/1995 | Kosaka et al. ................. 356/73 |
| 5,504,337 A | 4/1996 | Lakowicz et al. ....... 250/461.2 |
| 5,537,247 A | 7/1996 | Xiao ........................... 359/368 |
| 5,547,849 A | 8/1996 | Baer et al. .................. 435/7.24 |
| 5,548,661 A | 8/1996 | Price et al. .................. 382/133 |
| 5,578,832 A | 11/1996 | Trulson et al. ............ 250/458.1 |
| 5,684,575 A | 11/1997 | Steen ........................... 356/73 |
| 5,763,870 A | 6/1998 | Sadler et al. ............. 250/201.2 |
| 5,783,814 A * | 7/1998 | Fairley et al. ........... 250/201.3 |
| 5,790,692 A | 8/1998 | Price et al. .................. 382/133 |
| 5,793,485 A | 8/1998 | Gourley ...................... 356/318 |
| 5,804,813 A | 9/1998 | Wang et al. ............. 250/201.3 |
| 5,856,665 A | 1/1999 | Price et al. .................. 250/205 |
| 5,874,011 A | 2/1999 | Ehrlich ......................... 216/65 |
| 5,885,840 A | 3/1999 | Kamentsky et al. .......... 436/63 |
| 5,993,665 A | 11/1999 | Terstappen et al. ......... 210/695 |
| 6,013,188 A | 1/2000 | Terstappen et al. ......... 210/695 |
| 6,207,960 B1 * | 3/2001 | Stern ....................... 250/458.1 |
| 6,245,585 B1 * | 6/2001 | Fujimoto ..................... 438/14 |

FOREIGN PATENT DOCUMENTS

| | | |
|---|---|---|
| EP | 489580 | 12/1991 |
| EP | 531543 | 3/1992 |
| WO | 88/02845 | 4/1988 |
| WO | 91/04468 | 4/1991 |
| WO | 92/06359 | 4/1992 |

* cited by examiner

Primary Examiner—Stephone B. Allen
(74) Attorney, Agent, or Firm—Testa, Hurwitz & Thibeault, LLP

(57) ABSTRACT

The invention relates to a method and system for focusing a laser scanning cytometer. In the illustrative embodiment, during one cytometric measurement process, a single laser is used for focusing the cytometer and for taking cytometric measurements. Laser light is transmitted though an objective lens and directed at a substrate in order to cause markers in a sample on the substrate 122 to fluoresce. A byproduct the of cytometric measurement is that a portion of the laser light incident on the substrate 122 with or without a sample is backscattered. The objective of the illustrative system collects the backscattered light along with the fluorescing light. Optical elements separate this backscattered laser light from the fluorescing light. The illustrative system uses the backscattered light to focus the objective. According to a further feature, the illustrative system uses the backscattered light to generate a representative focal plane and/or topographical focal map of the substrate to determine the optimal focal distance for cytometric measurements made at any location on the substrate.

41 Claims, 6 Drawing Sheets

APPARATUS AND METHOD FOR FOCUSING A LASER SCANNING CYTOMETER

FIELD OF THE INVENTION

The invention relates to laser scanning cytometry. More particularly, the invention relates to a system for automatically focusing a laser scanning cytometer on a substrate.

BACKGROUND

Laser scanning cytometers can be used for detecting and measuring various properties of a biological sample. Typically, the sample is located on a substrate and stained with a fluorescent dye which binds to a particular cell constituent. An objective lens emits a laser beam onto the sample. Each fluorescently marked cell illuminated by the laser beam emits a pulse of fluorescent light. The intensity of the pulse of fluorescent light depends on the amount of fluorescent dye contained in the cell. Typically, a detector measures the fluorescent intensity of each cell. From the intensity of the fluorescent light pulse, a processor can determine the amount of the particular cell constituent present in the sample. Some laser scanning cytometers employ a plurality of dyes, each selected to bind to a different cell constituent. Laser scanning cytometers may also illuminate the sample at a plurality of wavelengths to determine the presence and/or concentration of multiple cellular constituents and other features of the cells contained in the sample.

Typically, when a laser scanning cytometer scans a sample on a surface of a substrate, the objective lens has a relatively narrow depth of focus (i.e., a focus window). If the substrate surface falls outside of the depth of focus window, cell constituent detection is less than optimal. A variety of factors can cause at least portions of the substrate surface to fall outside of the depth of focus window. For example, manufacturing imperfections in the substrate upon which the sample is located, and tolerance imperfections in mechanisms that hold the substrate in place, can cause the surface of the substrate to be tilted or displaced relative to the focal plane of the objective lens.

Accordingly, one object of the invention is to provide a system for determining and maintaining a more optimal relationship between the relative positions of the objective lens and the substrate holding the sample to be analyzed.

SUMMARY OF THE INVENTION

The invention relates to a method and system for focusing a laser scanning cytometer. A single laser is used for taking cytometric measurements and for focusing the cytometer. Laser light is transmitted though an objective lens and directed at a substrate to cause markers in a sample to fluoresce. A byproduct of cytometric measurements is that a portion of the laser light incident on the substrate is backscattered and collected by the objective along with the fluorescing light. This backscattered laser light is separated from the fluorescent signal and used to focus the objective.

According to one embodiment, the invention relates to a method of determining an optimal focal distance. The method includes transmitting laser light through an objective lens at a plurality of focal distances onto a substrate at a plurality of locations. The objective lens receives a plurality of reflected components of the laser light at each of the plurality of focal distances at each of the plurality of locations. The plurality of reflected components received at each of the plurality of focal distances at each of the plurality of locations are processed to determine which focal distance is the optimal focal distance for each of the plurality of locations. The laser light and the objective lens also enable focus measurements to be made with or without a test sample placed on the substrate.

In one aspect, the method includes processing the optimal focal distance for at least a portion of the plurality of locations to determine a focal plane, wherein the focal plane provides a planar approximation of the optimal focal distance for locations on the substrate in addition to the plurality of locations.

In another aspect, the method includes defining a plurality of scan fields on the substrate, wherein each of the scan fields contains at least one of the plurality of locations. The optimal focal distance is selected in each of the plurality of scan fields to be a representative focal distance for each of the plurality of scan fields. The representative focal distance for each of the plurality of scan fields is processed to generate a map of the representative focal distance for each of the plurality of scan fields. At least one of the plurality of locations within each of the plurality of scan fields is the geometric center of the scan field.

In another aspect, the method includes interpolating between the optimal focal distance for ones of the plurality of locations to generate a map representative of an approximation of the optimal focal distance for locations on the substrate in addition to the plurality of locations.

In still another aspect, the method includes scanning the laser beam through the objective lens at each of the plurality of focal distances onto the substrate and through each of the plurality of locations to generate a scan line corresponding to each of the plurality of focal distances at each of the plurality of locations. The objective lens then receives the plurality of reflected components, wherein the plurality of reflected components is received at each of the corresponding focal distances and from a plurality of scan locations along a scan line corresponding to one of the plurality of locations. The plurality of reflected components associated with each of the scan locations along each of the scan lines at each of the plurality of focal distances are then processed to determine the optimal focal distance for each of the plurality of locations. The reflected components from a plurality of the scan lines corresponding to one of the plurality of focal distances for each of the plurality of the focal distances can be averaged to determine the optimal focal distance for each of the plurality of locations. The reflected components of each one of the plurality of scan lines can be processed to obtain the characteristics of a spatial frequency spectrum for each one of the plurality of scan lines to determine the optimal focal distance for each of the plurality of locations. Such characteristics include power at a specific frequency or the power sum over a band of frequencies. The reflected components of each one of the plurality of scan lines can also be processed to obtain a normalized value for each one of the plurality of scan lines to determine the optimal focal distance for each of the plurality of locations. According to one aspect, the laser light is moved along the scan line with a galvanometer-controlled mirror and the plurality of reflected components are collected with a photo-detector.

According to another embodiment, the invention relates to a system for determining an optimal focal distance. The system includes a laser source adapted to provide laser light, an objective, and a processor. The objective is adapted to direct said laser light at a plurality of focal distances onto a substrate at a plurality of locations, and to receive a plurality of reflected components of the laser light at each of the plurality of locations. The objective receives reflected components at a corresponding one of the plurality of focal distances, and from a corresponding one of the plurality of locations. The processor is adapted to process the plurality of reflected components corresponding to each of the plurality of focal distances at each of the plurality of locations to determine the optimal focal distance for each of the plurality of locations.

According to one feature, the processor is adapted to select one of the plurality of focal distances as the optimal focal distance and to process the optimal focal distance for at least a portion of the plurality of locations to determine a focal plane, wherein the focal plane provides a planar approximation of the optimal focal distance for locations on the substrate in addition to the plurality of locations.

According to another feature, the processor is adapted to define a plurality of scan fields on the substrate, wherein each of the scan fields contains at least one of the plurality of locations. The processor selects the optimal focal distance for the at least one of the plurality of locations in each of the plurality of scan fields to be a representative focal distance for each of the plurality of scan fields. The processor processes the representative focal distance for each of the plurality of scan fields to generate a map of the representative focal distance for each of the plurality of scan fields. Additionally, the processor selects the at least one of the plurality of locations to be at a geometric center of each of the plurality of scan fields.

According to another feature, the processor is adapted to interpolate between the optimal focal distance for ones of the plurality of locations to generate a map representative of an approximation of the optimal focal distance for locations on the substrate in addition to the plurality of locations.

According to still another feature, the laser source is adapted to scan the laser beam through the objective at each of the plurality of focal distances onto the substrate and through each of the plurality of locations to generate a scan line corresponding with each of the plurality focal distances at each of the plurality of locations. Also, the objective is adapted to receive the plurality of reflected components, wherein each of the plurality of reflected components is received at the corresponding one of the plurality of focal distances and from a plurality of scan locations along a scan line corresponding to one of the plurality of locations. Additionally, the processor is adapted to process the plurality of reflected components associated with each of the scan locations along each of the scan lines at each of the plurality of focal distances to determine the optimal focal distance for each of the plurality of locations.

According to another feature, the processor is also adapted to average the reflected components from a plurality of the scan lines corresponding to one of the plurality of focal distances for each of the plurality of the focal distances to determine the optimal focal distance for each of the plurality of locations. According to a further feature, the processor is adapted to process the reflected components of each one of the plurality of scan lines to obtain the characteristics of a spatial frequency spectrum for each one of the plurality of scan lines to determine the optimal focal distance for each of the plurality of locations. According to a further feature, the processor is adapted to process the reflected components of each one of the plurality of scan lines to obtain a normalized value for each one of the plurality of scan lines to determine the optimal focal distance for each of the plurality of locations.

According to another embodiment, the invention relates to a method for performing a laser-based measurement. The method includes transmitting laser light through an objective along an optical axis at a plurality of focal distances onto a substrate at a plurality of locations. The objective receives a plurality of reflected components of the laser light at each of the plurality of locations, wherein each of the plurality of reflected components is received at a corresponding one of the plurality of focal distances and from a corresponding one of the plurality of locations. The plurality of reflected components corresponding to each of the plurality of focal distances at each of the plurality of locations are processed to determine the optimal focal distance for each of the plurality of locations. A representation of the optimal focal distance for each of the plurality of locations is stored. According to another feature, the method includes introducing a sample onto the substrate and measuring a characteristic of the sample by selecting a measurement location on the substrate, selecting a focal distance for the objective based at least in part on the stored representation, and performing a laser-based measurement on the sample at the measurement location and at the selected focal distance. The measuring step can be performed at additional measurement locations.

According to one aspect, the method includes performing the laser measurement at least in part by measuring a fluorescence characteristic of the sample and selecting one of the plurality of focal distances as the optimal focal distance. According to another aspect, the method includes processing the optimal focal distance for at least a portion of the plurality of locations to determine a focal plane, wherein the focal plane provides a planar approximation of the optimal focal distance for locations on the substrate in addition to the plurality of locations. According to another feature, the method includes defining a plurality of scan fields on the substrate, wherein each of the scan fields contains at least one of the plurality of locations. According to another feature, the method includes selecting the optimal focal distance for the at least one of the plurality of locations in each of the plurality of scan fields to be a representative focal distance for each of the plurality of scan fields. The representative focal distance for each of the plurality of scan fields is processed to generate a map of the representative focal distance for each of the plurality of scan fields. At least one of the plurality of locations within each of the plurality of scan fields is at a geometric center of each scan field.

According to another feature, the method includes interpolating between the optimal focal distance for ones of the plurality of locations to generate a map representative of an approximation of the optimal focal distance for locations on the substrate in addition to the plurality of locations.

According to another feature, the method includes scanning the laser beam through the objective at each of the plurality of focal distances onto the substrate and through each of the plurality of locations to generate a scan line corresponding with each of the plurality of focal distances at each of the plurality of locations. According to a further feature, the method includes receiving the plurality of reflected components, wherein each of the plurality of reflected components is received at the corresponding one of the plurality of focal distances and from a plurality of scan locations along a scan line corresponding to one of the plurality of locations. The plurality of reflected components associated with each of the scan locations along each of the scan lines at each of the plurality of focal distances are processed to determine the optimal focal distance for each of the plurality of locations. The reflected components from a plurality of the scan lines corresponding to one of the plurality of focal distances for each of the plurality of the focal distances can be averaged to determine the optimal focal distance for each of the plurality of locations. The reflected components of each one of the plurality of scan lines can be processed to obtain a spatial frequency for each one of the plurality of scan lines to determine the optimal focal distance for each of the plurality of locations. The reflected components of each one of the plurality of scan lines can be processed to obtain a normalized value for each one of the plurality of scan lines to determine the optimal focal distance for each of the plurality of locations. The laser light is moved along the scan line with a galvanometer-controlled mirror and the plurality of reflected components is collected with a photo-detector.

BRIEF DESCRIPTION OF THE DRAWINGS

The invention is pointed out with particularity in the appended claims. The above and further advantages of the invention may be better understood by referring to the following description in conjunction with the accompanying drawings, in which:

DESCRIPTION OF THE ILLUSTRATIVE EMBODIMENT

The invention relates to a method and system for focusing a laser scanning cytometer. In the illustrative embodiment, during one cytometric measurement process, a single laser is used for taking cytometric measurements and for focusing the cytometer. Laser light is transmitted though an objective lens and directed at a substrate in order to cause markers in a sample on the substrate to fluoresce. A byproduct the of cytometric measurement is that a portion of the laser light incident on the sample and/or substrate is backscattered (components of the laser light incident on the sample and/or substrate are reflected directly back toward the objective). The objective of the illustrative system collects the backscattered light along with the fluorescent signal. Optical elements separate this backscattered laser light from the fluorescent signal. The illustrative system uses the backscattered light to focus the objective. According to a further feature, the illustrative system uses the backscattered light to generate a representative focal plane and/or topographical focal map of the substrate to determine the optimal focal distance for cytometric measurements made at any location on the substrate.

Figure 1:
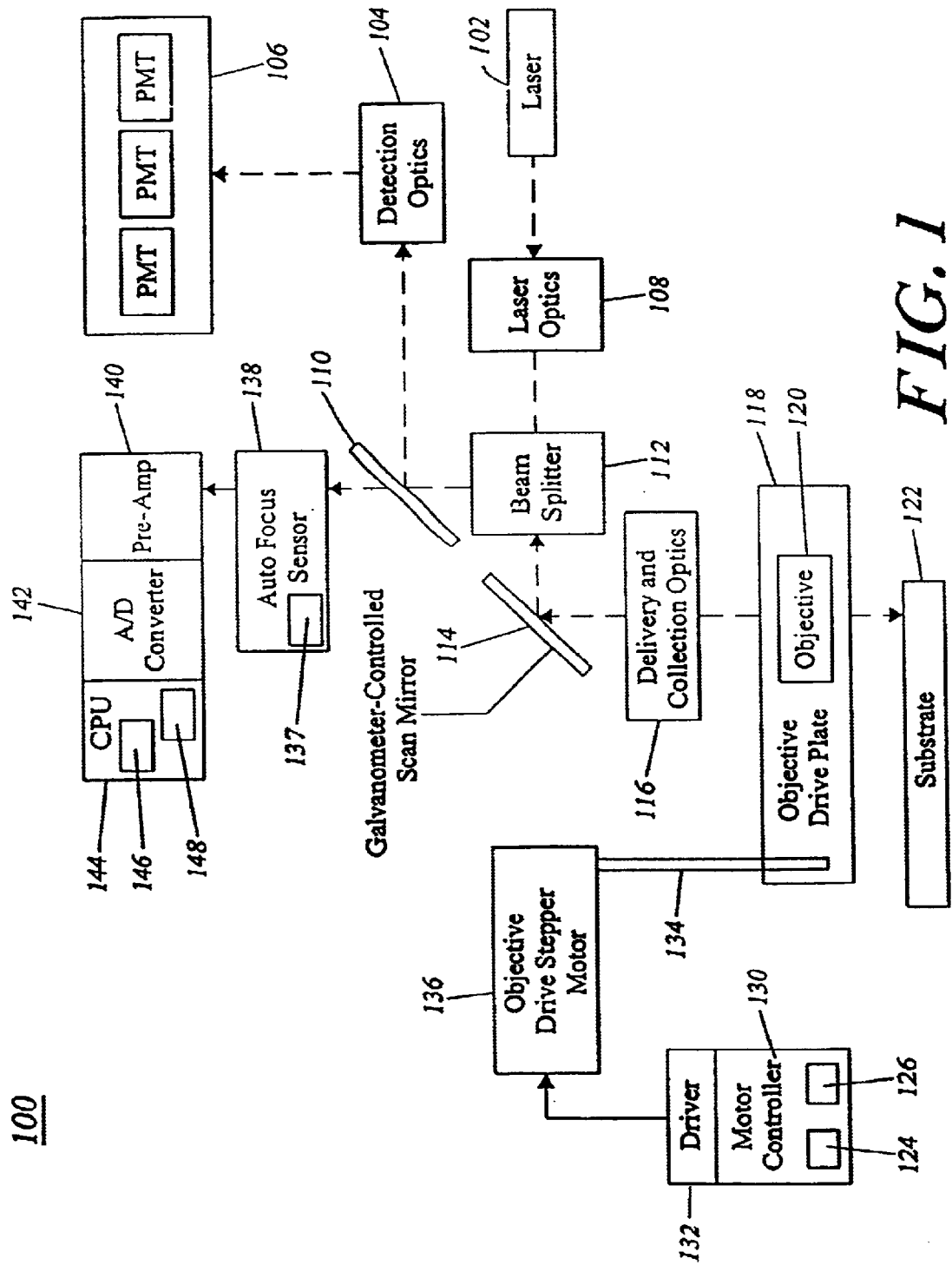
FIG. 1 is a conceptual block diagram of a laser scanning cytometer employing an automated focusing system according to an illustrative embodiment of the invention.

FIG. 1 depicts a conceptual block diagram of a laser scanning cytometer 100 employing an automated focusing system according to one embodiment of the invention. The laser scanning cytometer 100 includes a laser 102, detection optics 104, a bank of photo-multiplier tubes (PMTs) 106, laser optics 108, a dichroic beam-splitter 112, a detection dichroic beam-splitter 110, an auto-focus sensor 138, a galvanometer-controlled scan-mirror (scan-mirror) 114, delivery and collection optics 116, an objective drive-plate (drive plate) 120, an objective lens 118, a lead-screw 134, an objective drive stepper-motor (stepper-motor) 136, a motor-controller 130 including a processor 124 and memory 126, a driver 132, a substrate 122, an A/D converter 140, a pre-amplifier (pre-amp) 142, and a central processing unit (CPU) 144 with a processor 146 and memory 148.

The laser 102 continuously transmits laser light through the laser optics 108 and then through the beam-splitter 112 to the scan-mirror 114. The scan-mirror 114 redirects the laser light through the delivery and collection optics 116 and then through the objective 120, which is mounted on the objective drive plate 118. The laser light exits the objective 120 and impacts the substrate 122. As mentioned above, a portion of the laser light incident on the substrate 122 is backscattered and portion of this backscattered light is collected by the objective 120 along with a portion of the fluorescent signal created by laser light incident on sample markers. The fluorescent signal/backscattered light combination passes back through the delivery and collection optics 116 to the scan-mirror 114. The scan-mirror 114 redirects the fluorescent signal/backscattered light combination to the beam-splitter 112. The beam-splitter 112 then directs the fluorescent signal/backscattered light combination to the detection dichroic beam-splitter 110 where the fluorescent signal and backscattered light are separated. The detection dichroic beam-splitter 110 directs the fluorescent signal to the detection optics 104. The detection optics 104 then direct the fluorescent signal to the bank of PMTs 106. The detection dichroic beam-splitter 110 also passes the backscattered light to the auto-focus sensor 138.

The auto-focus sensor 138 may include an aspheric lens for increased light collection and a photo-sensor 137 such as a photovoltaic sensor or phototransistor, for example. After the backscattered light reaches the auto-focus sensor 138, the photo-sensor 137 converts the backscattered light signal to an analog electrical signal. The pre-amp 140 then amplifies the analog electrical signal and the A/D converter 142 digitizes the analog electrical signal. In one embodiment, the frequency response of the auto-focus sensor 138 and the pre-amp 140 is one MHz and the resolution of the A/D converter is fourteen bits.

The CPU 144 receives the digital signal from the A/D converter 142 and stores the digital signal in memory 148 for processing by the processor 146 according to various data analysis routines. In one embodiment, according to one data analysis routine, the processor 146 processes multiple digital signals to determine an optimal focal point at one location on the substrate 122 and is discussed in further detail below. As discussed in further detail below, in other embodiments, according to other data analysis routines, the processor 146 processes multiple digital signals to generate a focal plane and/or a topographical focal map.

The CPU 144 also controls the motor controller 130. The motor controller 130 and the driver 132 together control the stepper motor 136. The stepper motor 136 is connected to the lead-screw 134, which is used to move the drive plate 118 (and therefore the objective 120) along an optical (or Z) axis in order to change the objective's focal distance from the substrate 122.

Figure 2:
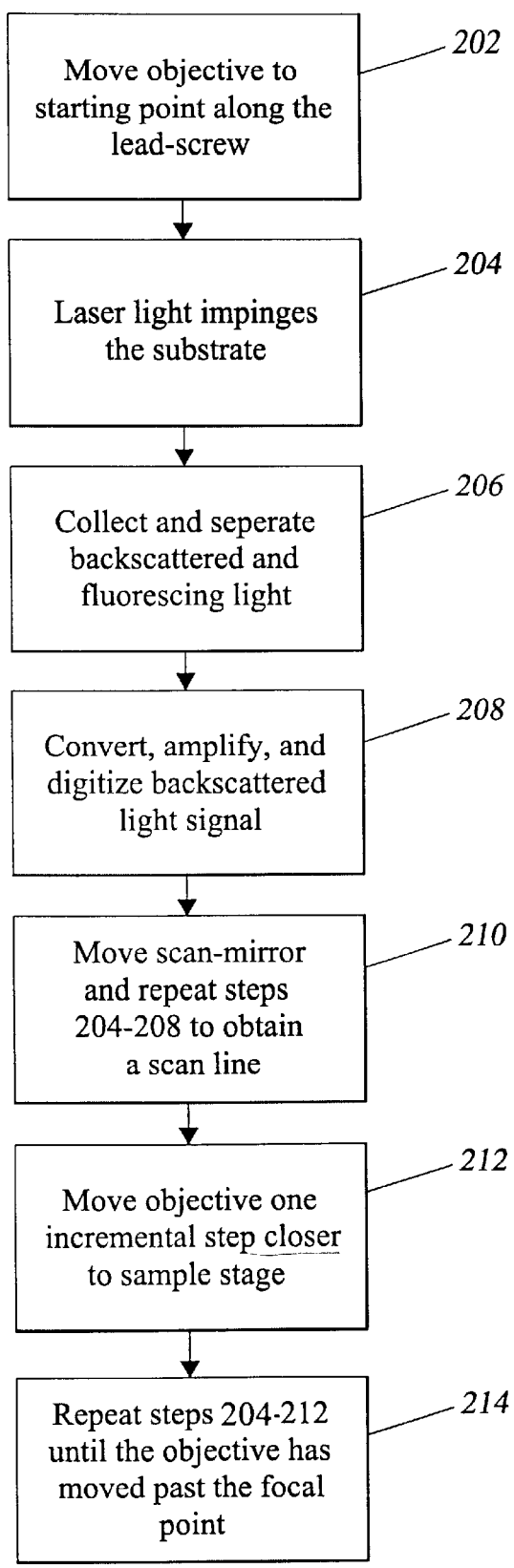
FIG. 2 is a flow chart illustrating a method for determining a focal distance using the automated focusing system of FIG. 1.

FIG. 2 is a flow chart 200 illustrating a method for determining a focal distance using the automated focusing system of FIG. 1. Referring to FIGS. 1 and 2, in one embodiment of the invention, the CPU 144 directs the objective 120 (as described above) to a starting position above the optimal focal point along the lead-screw 134, as indicated in step 202. Laser light from a continuously transmitting impinges the substrate 122 with or without a sample, as indicated in step 204. As previously mentioned, the laser light incident on the substrate 122 with or without a sample produces backscattered light. If there is a sample on the substrate 122, the portion of the laser light incident on the sample markers produces a fluorescent signal in addition to the backscattered light. If there is no sample on the substrate 122, then no fluorescent signal is produced. A sample is not required to be on the substrate 122 to successfully determine the optimal focal distance.

As mentioned above, the objective 120 collects the fluorescing/backscattered light combination and directs the light through the delivery and collection optics 116 to the scan-mirror 114. The scan-mirror 114 redirects the fluorescing/backscattered light combination to the beam-splitter 112. As indicated in step 206, the beam-splitter 112 then directs the fluorescing/backscattered light combination to the detection dichroic beam-splitter 110 where the fluorescent signal and backscattered light are separated. The detection dichroic beam-splitter 110 directs the fluorescent signal to the detection optics 104. The detection optics 104 then direct the fluorescent signal to the bank of PMTs 106. Again, if there is no sample present on the substrate 122, there will be no fluorescent signal component. The detection dichroic beam-splitter 110 also passes the backscattered light to the auto-focus sensor 138. As indicated in step 208 and described above, the backscattered light is then converted to an electrical signal, amplified, and digitized. The memory 148 stores the digitized signal for later processing.

As indicated in step 210, a galvanometer moves the scan-mirror 114 and steps 204 to 208 are repeated to obtain one scan line. In one embodiment, a scan line is obtained by the galvanometer moving the scan-mirror 114 so that the scan-mirror 114 directs the laser light in a continuous sweep across the substrate 112. In this embodiment, the laser light sweep is five hundred and thirty-eight microns long and five microns wide. As the scan-mirror 114 sweeps the laser light across the substrate 112, the auto-focus sensor 138 captures the backscattered light at timed intervals such that for one scan line the backscattered light data is captured a total of seven hundred and sixty-eight times in increments of 0.7 microns. Each 0.7 micron interval of backscattered light data is considered a pixel. In an another embodiment, the average of multiple scan lines can be obtained instead of a single scan line.

After the scan line is obtained it is stored in memory 148, and as described in step 212, the motor controller 130 instructs the stepper motor 136 to move the objective 120 one incremental step closer to substrate 122. In one embodiment, the incremental step is ten microns. However, skilled artisans will appreciate that in other embodiments the incremental step could be other distances. As shown in step 214, the illustrative system repeats steps 202 through 212 until the objective 120 moves through an estimated optimal focal distance, which is based on the properties of the objective used. Thus, the stepper motor 130 moves the objective 120 in incremental steps along the lead-screw from one side of the estimated optimal focal distance, through the estimated optimal focal distance, and past the estimated optimal focal distance, while the memory 148 stores the digitized scan line data for each incremental step. As mentioned above, and as discussed in further detail below, the processor 146 can then process the scan line data that is stored in the memory 148 according to various analysis routines to determine the actual optimal focal distances to be used at each location on the substrate 122.

Figure 3:
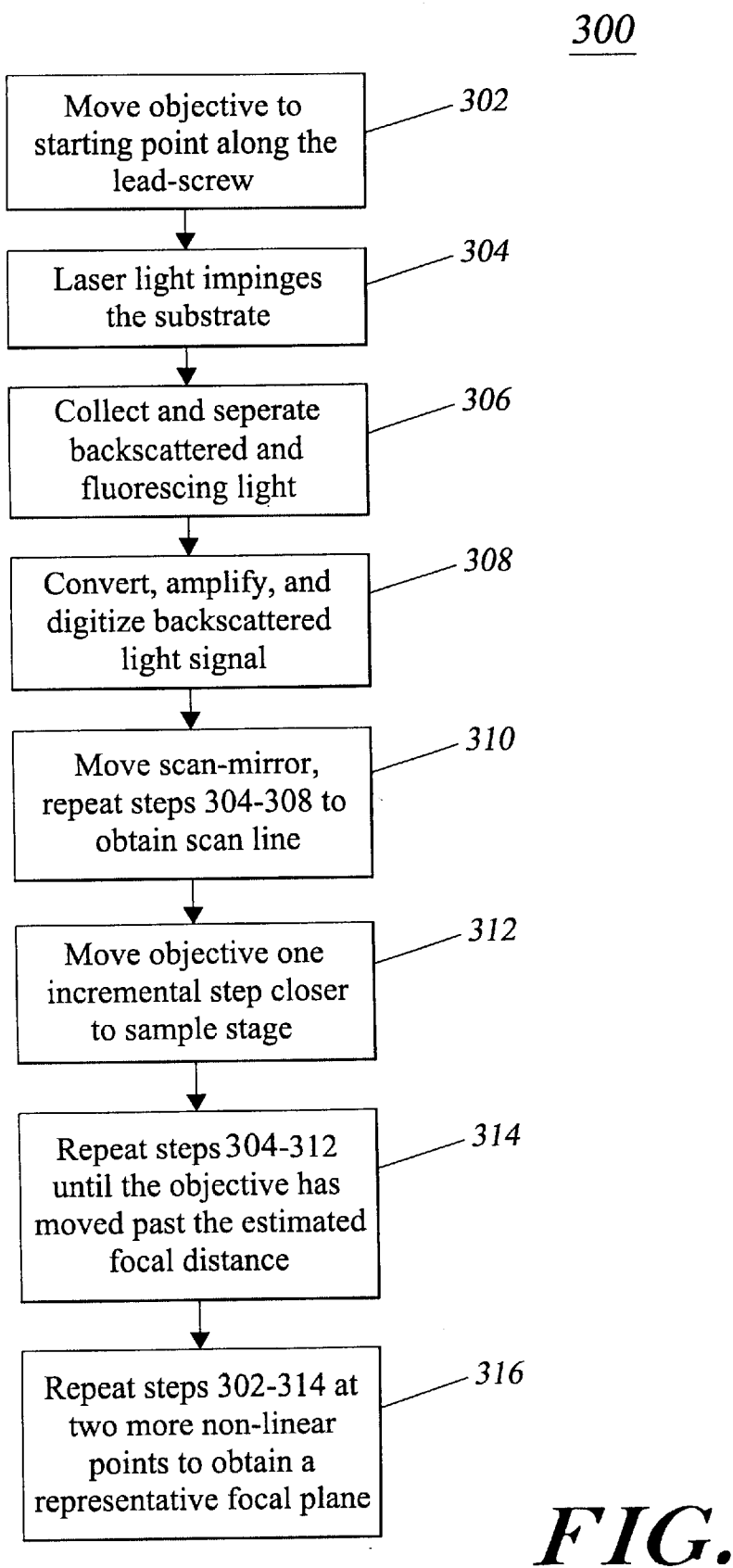
FIG. 3 is a flow chart illustrating a method for determining a representative focal plane using the automated focusing system of FIG. 1.

FIG. 3 is a flow chart 300 illustrating a method for determining a representative focal plane using the automated focusing system of FIG. 1. As indicated in FIG. 3, steps 302 through 314 are the same as the steps 202 through 214 described in FIG. 2. As shown in the additional step 316, the illustrative system repeats steps 304 through 314 at two other non-collinear locations on the substrate 122. This results in the memory 148 storing scan line data for three separate non-collinear locations on the substrate 122. As mentioned above, and as discussed in further detail below, the processor 146 then processes the scan line data that are stored in the memory 148 according to various analysis routines to determine the optimal focal distance for each of the three separate non-collinear locations on the substrate 122. From the focal distances of the three non-collinear locations, the processor 146 extrapolates a focal plane representative of focal distances for any location on the substrate 122. The memory 148 then stores the representative focal plane. During cytometric measurements, the illustrative system consults the representative focal plane to determine where along the lead-screw 134 to position the objective 120, based on the location of the objective in the plane of the substrate 122.

Figure 4:
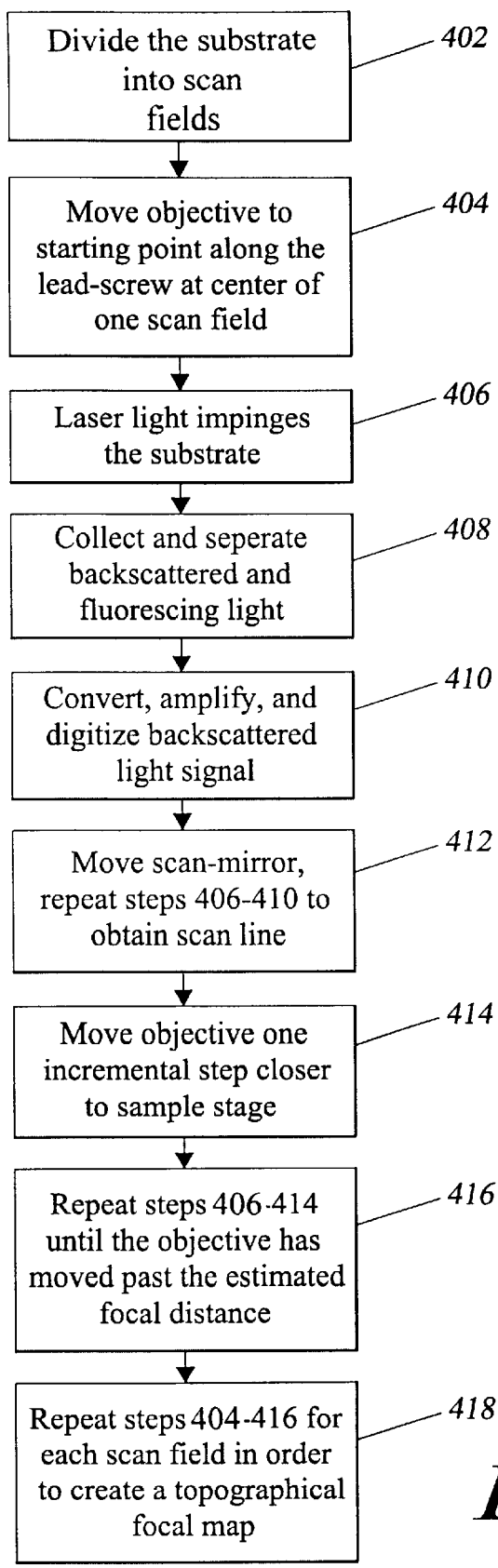
FIG. 4 is a flow chart illustrating a method for determining a topographical focal map using the automated focusing system of FIG. 1.
Figure 5:
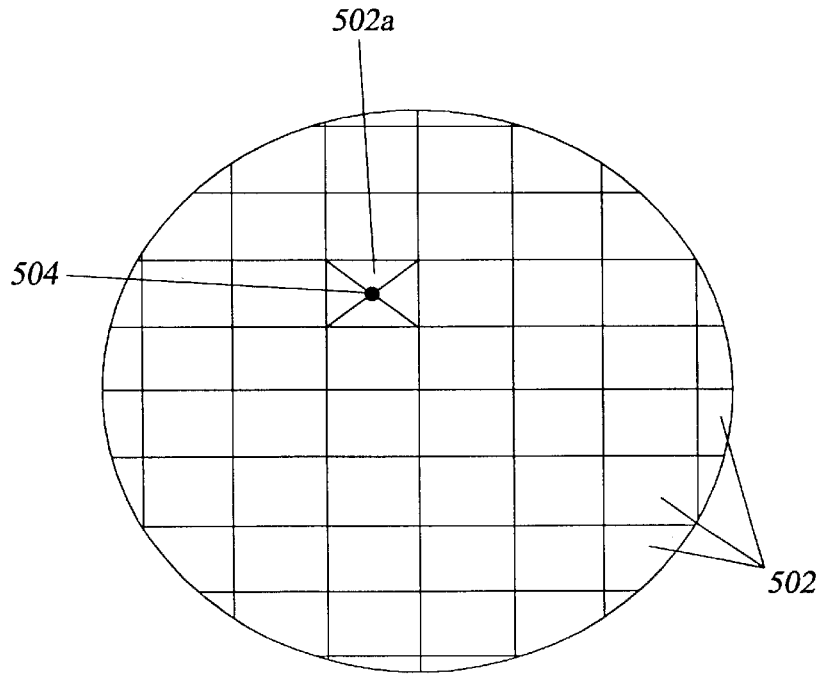
FIG. 5 is an illustrative example of a scan field grid used in the method for determining a topographical focal map shown in FIG. 4.

FIG. 4 is a flow chart 400 illustrating a method for determining a topographical focal map using the automated focusing system of FIG. 1, and FIG. 5 is an illustrative example of a scan field grid 500 used in the method for determining a topographical focal map. Referring to FIGS. 4 and 5, as indicated in step 502, the processor 146 creates a scan field grid 500 and stores it in memory 148. The scan field grid 500 is a plane of scan fields 502 overlayed on the substrate 122. In one embodiment, each scan field is five hundred and thirty-seven microns long and five hundred microns wide. In this embodiment, the scan field length is configured in this manner to coincide with the scan line length (also 537 microns long) so the system can capture and store scan lines from each scan field 502. As indicated in FIG. 5, steps 504 through 516 are the same as the steps 202 through 214 described in FIG. 2 and steps 302 through 314 described in FIG. 3. However, when the stepper motor 130 moves the objective 120 to a starting point along the lead-screw 134, as indicated in step 504, the stepper motor 130 also moves the objective 120 over the geometric center 504 of a scan field 502a. As indicated in step 518, the illustrative system repeats steps 504 through 516 for each scan field 502 in the scan field grid 500. This results in the memory 148 storing scan line data for each scan field 502 on the substrate 122. As mentioned above, and as discussed in further detail below, the processor 146 then processes the scan line data that is stored in the memory 148 according to various analysis routines to determine the optimal focal distance for each of the scan fields 502 on the substrate 122. From the focal distances corresponding to each scan field 502, the processor 146 generates a topographical focal map where each focal distance is representative of the focal distances for any location in the corresponding scan field 502. The memory 148 then stores the topographical focal map. During cytometric measurements, the illustrative system consults the topographical focal map to determine where along the lead-screw 134 to position the objective 120 based on the location of the objective in the plane of the scan field grid 500.

It should be noted that, although the illustrative system has been described as performing the auto-focus and cytometric functions separately, the auto-focus and cytometric functions can be performed at the same time.

As previously mentioned, the processor 146 processes digital scan line data that is stored in the memory 148 according to various analysis routines to determine the optimal focal distance. The various analysis routines, described below with respect to FIGS. 6 and 7, can be applied to the data from each of three locations on the substrate 122 according to the focal plane method described in FIG. 3 or to the data from each of the scan fields 502 on the substrate 122 according to the topographical focal map method described in FIG. 4.

Figure 6:
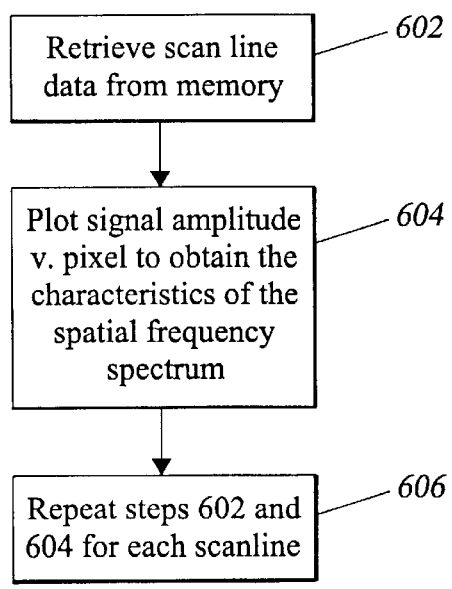
FIG. 6 is a flow chart illustrating a highest depth of modulation method of analyzing scan line data collected for the purpose of determining an optimal focal distance using the automated focusing system of FIG. 1.

FIG. 6. is a flow chart 600 illustrating a highest depth of modulation method of analyzing scan line data collected for the purpose of determining an optimal focal distance using the automated focusing system of FIG. 1. As indicated in step 601, the processor 146 retrieves the scan line data from memory 148 that was previously collected at the first focal distance from the substrate 122 (e.g. when the objective 120 was at the starting position along the lead-screw 134). The scan line data is the signal amplitude for each pixel in a scan line and, in one embodiment, a scan line is seven hundred and sixty-eight pixels. As shown in step 604, the processor 146 then generates a plot of signal amplitude vs. pixel. This plot represents the depth of modulation (or spatial frequency) at the first focal distance. As shown in step 606, the processor repeats steps 602 and 604 for each focal distance (e.g. each position along the lead-screw 134 where the system collected backscattered light data). Thus, for each focal distance there is a corresponding depth of modulation (or characteristic of the spatial frequency spectrum). The focal distance with the highest corresponding depth of modulation (or characteristic of the spatial frequency spectrum) is the optimal focal distance.

Figure 7:
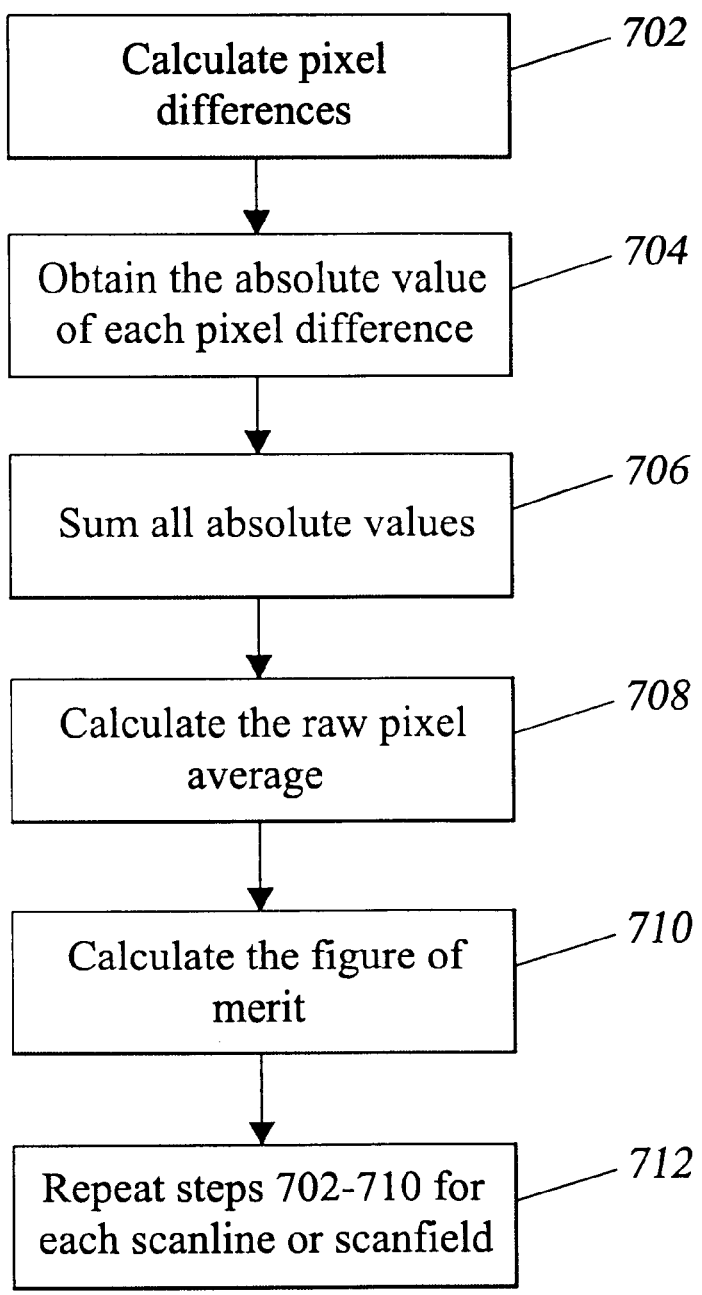
FIG. 7 is a flow chart illustrating a structured value method of analyzing scan line data collected for the purpose of determining an optimal focal distance using the automated focusing system of FIG. 1.

FIG. 7. is a flow chart 700 illustrating a structured value method of analyzing scan line data collected for the purpose of determining a focal point using the automated focusing system of FIG. 1. As indicated in step 702, the processor 146 calculates the pixel amplitude differences (e.g. 1st pixel–nth pixel, 2nd pixel–(nth+1) pixel, 3rd pixel–(nth+2) pixel, and so on) for an entire scan line at the first focal distance. As shown in step 704, the processor 146 next calculates the absolute value of each pixel difference. As indicated in step 706, the processor 146 calculates the sum of all the absolute values. As depicted in step 708, the processor 146 then calculates the raw average amplitude for the scan line. As shown in step 710, the processor 146 calculates the figure of merit by multiplying the value calculated in step 706 by the value calculated in step 708. As indicated in step 712, the processor 146 repeats steps 702 through 710 for each focal distance. Thus, the processor 146 calculates a figure of merit for each focal distance. The focal distance with the highest corresponding figure of merit is the optimal focal distance.

Generally, the samples that are placed on the substrate 122 are within the depth of focus of the automated focusing system. As a result, the optimal focal distance determined by the illustrative system without a sample on the substrate 122 does not change when a sample is later introduced onto the substrate 122. However, in some cases, the samples that are placed on the substrate 122 are larger than the depth of focus of the automated focusing system. If such a sample is placed on the substrate 122 after the illustrative system has determined the optimal focal distance, the optimal focal distance is no longer accurate. Focal distance offsets are used to compensate for events that are larger than the system's depth of focus. In one embodiment, the focal distance offset used is based on the thickness of the sample that extends beyond the system's depth of focus. The illustrative system subtracts from each optimal focal distance (determined without a sample present on the substrate 122) a value equal to the thickness of the sample that extends beyond the system's depth of focus.

Accordingly, it is intended that all matter contained in the above description be interpreted as illustrative rather than in a limiting sense, the scope of the invention being indicated by the appended claims rather than by the foregoing description. It is also intended that the appended claims cover all the generic and specific features of the invention as described herein, and all of the changes which come within the meaning and range of equivalency of the claims.

I claim:

1. A method for determining an optimal focal distance, said method comprising, changing a distance along an optical axis between an objective and a substrate to establish a plurality of focal distances, transmitting laser light through said objective at said plurality of focal distances onto said substrate at each of a plurality of locations, wherein the substrate has a periphery and at least one of the plurality of locations is within the periphery of the substrate, receiving a plurality of reflected components of said laser light through said objective at each of said plurality of locations, wherein each of said plurality of reflected components is received at a corresponding one of said plurality of focal distances and from a corresponding one of said plurality of locations, processing said plurality of reflected components corresponding to each of said plurality of focal distances at each of said plurality of locations to determine said optimal focal distance for each of said plurality of locations, and wherein said laser light and said objective also enable measurement of characteristics of a test sample placed on said substrate.

2. The method of claim 1 further comprising, selecting one of said plurality of focal distances as said optimal focal distance.

3. The method of claim 1 further comprising, processing said optimal focal distance for at least a portion of said plurality of locations to determine a focal plane, wherein said focal plane provides a planar approximation of said optimal focal distance for locations on said substrate in addition to said plurality of locations.

4. The method of claim 1 further comprising, defining a plurality of scan fields on said substrate, wherein each of said scan fields contains at least one of said plurality of locations, selecting said optimal focal distance for said at least one of said plurality of locations in each of said plurality of scan fields to be a representative focal distance for each of said plurality of scan fields, and processing said representative focal distance for each of said plurality of scan fields to generate a map of said representative focal distance for each of said plurality of scan fields.

5. The method of claim 4, further comprising, providing said at least one of said plurality of locations at a geometric center of each of said plurality of scan fields.

6. The method of claim 1 further comprising,
interpolating between said optimal focal distance for ones of said plurality of locations to generate a map representative of an approximation of said optimal focal distance for locations on said substrate in addition to said plurality of locations.

7. The method of claim 1 further comprising, introducing a sample onto said substrate prior to transmitting said beam of light.

8. The method of claim 1 further comprising,
scanning said laser beam through said objective at each of said plurality of focal distances onto said substrate and through each of said plurality of locations to generate a scan line corresponding with each of said plurality focal distances at each of said plurality of locations,
receiving said plurality of reflected components, wherein each of said plurality of reflected components is received at said corresponding one of said plurality of focal distances and from a plurality of scan locations along a scan line corresponding to one of said plurality of locations, and
processing said plurality of reflected components associated with each of said scan locations along each of said scan lines at each of said plurality of focal distances to determine said optimal focal distance for each of said plurality of locations.

9. The method of claim 8 further comprising, averaging reflected components from a plurality of said scan lines corresponding to one of said plurality of focal distances for each of said plurality of said focal distances to determine said optimal focal distance for each of said plurality of locations.

10. The method of claim 8 further comprising,
processing said reflected components of each one of said plurality of scan lines to obtain characteristics of a spatial frequency spectrum for each one of said plurality of scan lines to determine said optimal focal distance for each of said plurality of locations.

11. The method of claim 8 further comprising,
processing said reflected components of each one of said plurality of scan lines to obtain a structured value for each one of said plurality of scan lines to determine said optimal focal distance for each of said plurality of locations.

12. The method of claim 8, further comprising moving said laser light along said scan line with a galvanometer-controlled mirror.

13. The method of claim 8, further comprising collecting said plurality of reflected components with a photo-detector.

14. A method for performing a laser-based measurement, said method comprising,
changing a distance along an optical axis between an objective and a substrate to establish a plurality of focal distances,
transmitting laser light through said objective along said optical axis at said plurality of focal distances onto said substrate at each of a plurality of locations, wherein the substrate has a periphery and at least one of the plurality of locations is within the periphery of the substrate,
receiving a plurality of reflected components of said laser light through said objective at each of said plurality of locations, wherein each of said plurality of reflected components is received at a corresponding one of said plurality of focal distances and from a corresponding one of said plurality of locations,
processing said plurality of reflected components corresponding to each of said plurality of focal distances at each of said plurality of locations to determine said optimal focal distance for each of said plurality of locations,
storing a representation of said optimal focal distance for each of said plurality of locations,
introducing a sample onto said substrate,
measuring a characteristic of said sample by,
selecting a measurement location on said substrate,
selecting a focal distance for said objective based at least in part on said stored representation, and
performing a laser-based measurement on said sample at said measurement location and at said selected focal distance, and
performing said measuring step at additional measurement locations.

15. The method of claim 14 further comprising, employing said laser light for measuring said characteristic of said sample.

16. The method of claim 14 further comprising, performing said laser measurement at least in part by measuring a fluorescence characteristic of said sample.

17. The method of claim 14 further comprising, selecting one of said plurality of focal distances as said optimal focal distance.

18. The method of claim 14 further comprising,
processing said optimal focal distance for at least a portion of said plurality of locations to determine a focal plane,
wherein said focal plane provides a planar approximation of said optimal focal distance for locations on said substrate in addition to said plurality of locations.

19. The method of claim 14 further comprising,
defining a plurality of scan fields on said substrate, wherein each of said scan fields contains at least one of said plurality of locations,
selecting said optimal focal distance for said at least one of said plurality of locations in each of said plurality of scan fields to be a representative focal distance for each of said plurality of scan fields, and
processing said representative focal distance for each of said plurality of scan fields to generate a map of said representative focal distance for each of said plurality of scan fields.

20. The method of claim 19, further comprising, providing said at least one of said plurality of locations at a geometric center of each of said plurality of scan fields.

21. The method of claim 14 further comprising,
interpolating between said optimal focal distance for ones of said plurality of locations to generate a map representative of an approximation of said optimal focal distance for locations on said substrate in addition to said plurality of locations.

22. The method of claim 14 further comprising, introducing a sample onto said substrate prior to transmitting said beam of light.

23. The method of claim 14 further comprising,
scanning said laser beam through said objective at each of said plurality of focal distances onto said substrate and through each of said plurality of locations to generate a scan line corresponding with each of said plurality focal distances at each of said plurality of locations, receiving said plurality of reflected components, wherein each of said plurality of reflected components is received at said corresponding one of said plurality of focal distances and from a plurality of scan locations along a scan line corresponding to one of said plurality of locations, and processing said plurality of reflected components associated with each of said scan locations along each of said scan lines at each of said plurality of focal distances to determine said optimal focal distance for each of said plurality of locations.

24. The method of claim 23 further comprising, averaging reflected components from a plurality of said scan lines corresponding to one of said plurality of focal distances for each of said plurality of said focal distances to determine said optimal focal distance for each of said plurality of locations.

25. The method of claim 23 further comprising,
processing said reflected components of each one of said plurality of scan lines to obtain characteristics of a spatial frequency spectrum for each one of said plurality of scan lines to determine said optimal focal distance for each of said plurality of locations.

26. The method of claim 23 further comprising,
processing said reflected components of each one of said plurality of scan lines to obtain a structured value for each one of said plurality of scan lines to determine said optimal focal distance for each of said plurality of locations.

27. The method of claim 23, further comprising moving said laser light along said scan line with a galvanometer-controlled mirror.

28. The method of claim 23, further comprising collecting said plurality of reflected components with a photo-detector.

29. A system for determining an optimal focal distance, said system comprising,
a laser source adapted to provide laser light,
an objective adapted to direct said laser light at a plurality of focal distances onto a substrate at each of a plurality of locations, and to receive a plurality of reflected components of said laser light at each of said plurality of locations, wherein each of said plurality of reflected components is received at a corresponding one of said plurality of focal distances, and from a corresponding one of said plurality of locations and wherein the substrate has a periphery and at least one of the plurality of locations is within the periphery of the substrate,
a driver adapted to establish said plurality of focal distances by adjusting a distance along an optical axis between said objective and said substrate,
a processor, adapted to process said plurality of reflected components corresponding to each of said plurality of focal distances at each of said plurality of locations to determine said optimal focal distance for each of said plurality of locations.

30. The system of claim 29, wherein said processor is further adapted to select one of said plurality of focal distances as said optimal focal distance based.

31. The system of claim 29, wherein said processor is further adapted to process said optimal focal distance for at least a portion of said plurality of locations to determine a focal plane,
wherein said focal plane provides a planar approximation of said optimal focal distance for locations on said substrate in addition to said plurality of locations.

32. The system of claim 29, wherein said processor is further adapted
to define a plurality of scan fields on said substrate, wherein each of said scan fields contains at least one of said plurality of locations,
to select said optimal focal distance for said at least one of said plurality of locations in each of said plurality of scan fields to be a representative focal distance for each of said plurality of scan fields, and
to process said representative focal distance for each of said plurality of scan fields to generate a map of said representative focal distance for each of said plurality of scan fields.

33. The system of claim 32, wherein said processor is further adapted to select said at least one of said plurality of locations to be at a geometric center of each of said plurality of scan fields.

34. The system of claim 29, wherein said processor is further adapted to interpolate between said optimal focal distance for ones of said plurality of locations to generate a map representative of an approximation of said optimal focal distance for locations on said substrate in addition to said plurality of locations.

35. The system of claim 29, wherein said system is further adapted to enable introduction of a sample onto said substrate prior to said laser source transmitting said beam of light.

36. The system of claim 29, wherein said laser source is further adapted to scan said laser beam through said objective at each of said plurality of focal distances onto said substrate and through each of said plurality of locations to generate a scan line corresponding with each of said plurality of focal distances at each of said plurality of locations,
said objective is further adapted to receive said plurality of reflected components, wherein each of said plurality of reflected components is received at said corresponding one of said plurality of focal distances and from a plurality of scan locations along a scan line corresponding to one of said plurality of locations, and
said processor is further adapted to process said plurality of reflected components associated with each of said scan locations along each of said scan lines at each of said plurality.

37. The system of claim 36, wherein said processor is further adapted to average reflected components from a plurality of said scan lines corresponding to one of said plurality of focal distances for each of said plurality of said focal distances to determine said optimal focal distance for each of said plurality of locations.

38. The system of claim 36, wherein said processor is further adapted to process said reflected components of each one of said plurality of scan lines to obtain characteristics of a spatial frequency spectrum for each one of said plurality of scan lines to determine said optimal focal distance for each of said plurality of locations.

39. The system of claim 36, wherein said processor is further adapted to process said reflected components of each one of said plurality of scan lines to obtain a structured value for each one of said plurality of scan lines to determine said optimal focal distance for each of said plurality of locations.

40. The system of claim 36, wherein said processor is further adapted to move said laser light along said scan line with a galvanometer-controlled mirror.

41. The system of claim 36, wherein said system is further adapted to collect said plurality of reflected components with a photo-detector.

* * * * *